(12) United States Patent
Duesterwald et al.

(10) Patent No.: US 11,783,226 B2
(45) Date of Patent: Oct. 10, 2023

(54) MODEL TRANSFER LEARNING ACROSS EVOLVING PROCESSES

(71) Applicant: International Business Machines Corporation, Armonk, NY (US)

(72) Inventors: Evelyn Duesterwald, Millwood, NY (US); Vatche Isahagian, Belmont, MA (US); Vinod Muthusamy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 16/912,051

(22) Filed: Jun. 25, 2020

(65) Prior Publication Data

US 2021/0406760 A1 Dec. 30, 2021

(51) Int. Cl.
*G06N 20/00* (2019.01)
*G06N 20/10* (2019.01)

(52) U.S. Cl.
CPC ............. *G06N 20/00* (2019.01); *G06N 20/10* (2019.01)

(58) Field of Classification Search
CPC .... G06N 20/00; G06N 3/0445; G06N 3/0454; G06N 20/10; G06N 20/20; G06N 5/006
See application file for complete search history.

(56) References Cited

U.S. PATENT DOCUMENTS 10,438,132 B2 10/2019 Duggan et al.
2014/0046879 A1 2/2014 Maclennan et al.

2019/0121928 A1* 4/2019 Wu .................. G06F 30/398
2021/0383927 A1* 12/2021 Godden ............ G06N 5/04
2021/0390424 A1* 12/2021 Vo .................. G06Q 30/0185

FOREIGN PATENT DOCUMENTS

CN 110689139 1/2020

OTHER PUBLICATIONS

Avsec et al., "The Kipoi repository accelerates community exchange and reuse of predictive models for genomics," Nature Biotechnology, vol. 37, Jun. 2019, 9 pages.
"Filament Experts in Applied AI" 5 pages.
Kaushik, "Visualizing Decision Boundaries Builds Intuition About Algorithms," Medium, 13 pages.

(Continued)

*Primary Examiner* — Masud K Khan
(74) *Attorney, Agent, or Firm* — Amin, Turocy & Watson, LLP

(57) ABSTRACT

Systems, computer-implemented methods, and computer program products to facilitate model transfer learning across evolving processes are provided. According to an embodiment, a system can comprise a memory that stores computer executable components and a processor that executes the computer executable components stored in the memory. The computer executable components can comprise a condition definition component that defines one or more conditions associated with use of a model trained on first traces of a first process to make a prediction on one or more second traces of a second process. The computer executable components can further comprise a guardrail component that determines whether to use the model to make the prediction.

19 Claims, 11 Drawing Sheets

(56) References Cited

OTHER PUBLICATIONS

Mell et al., "The NIST Definition of Cloud Computing," Recommendations of the National Institute of Standards and Technology, NIST Special Publication 800-145, Sep. 2011, 7 pages.

Tan et al., "A Survey on Deep Transfer Learning," The 27th International Conference on Artificial Neural Networks, arXiv:1808.01974v1 [cs.LG], Aug. 6, 2018, 10 pages.

Wang et al., "Online Bagging and Boosting for Imbalanced Data Streams," arXiv:1310.8004 [cs.LG], Oct. 30, 2013, 15 pages.

Gama et al., "A Survey on Concept Drift Adaptation," ACM Computing Surveys, vol. 1, No. 1, Article 1, Jan. 2013, 44 pages.

\* cited by examiner

Let $t_2$ be a trace from $P_2$ where $act(P_1) \supseteq act(P_2)$.

Condition 502: Can use $M_1$ iff $act(t_2) \supseteq act(\hat{f}(M_1))$ and all $act(M_1(t_2))$ are reachable in $P_2$ along the same paths as those in $P_1$.

Case 7: $t_2$ does not conform to $P_1$  Case 8: $t_2$ does not conform to $P_1$

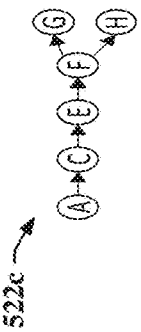
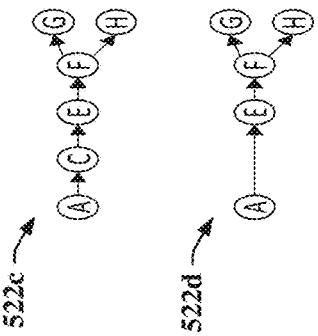
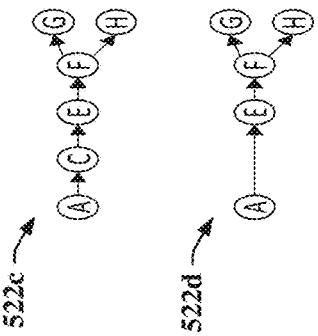

522a  522c $P_1$ 522b  522d $P_2$

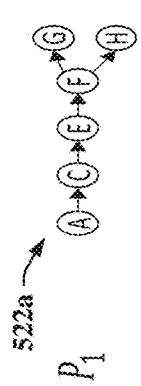
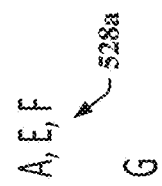

| | | |
|---|---|---|
| $act(t_2)$ | A, E, F | A, E, F |
| $act(M_1(t_2))$ | G | G |
| $act(\hat{f}(M_1))$ | A | A, C |
| Guardrail | Conditions satisfied → statistically safe | unsafe |

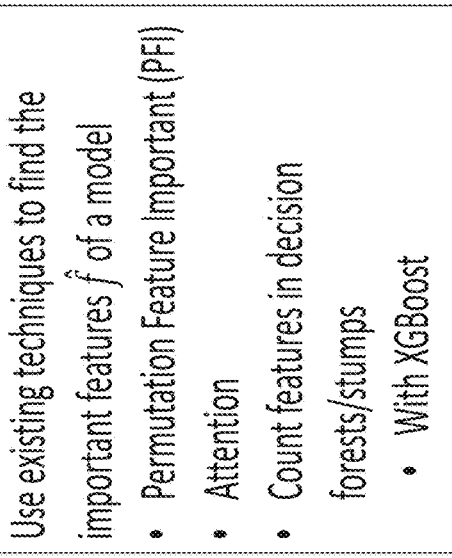

Use existing techniques to find the important features $\hat{f}$ of a model
- Permutation Feature Important (PFI)
- Attention
- Count features in decision forests/stumps
  - With XGBoost

*Informally, it's ok to remove nodes that don't affect the prediction.*

FIG. 5

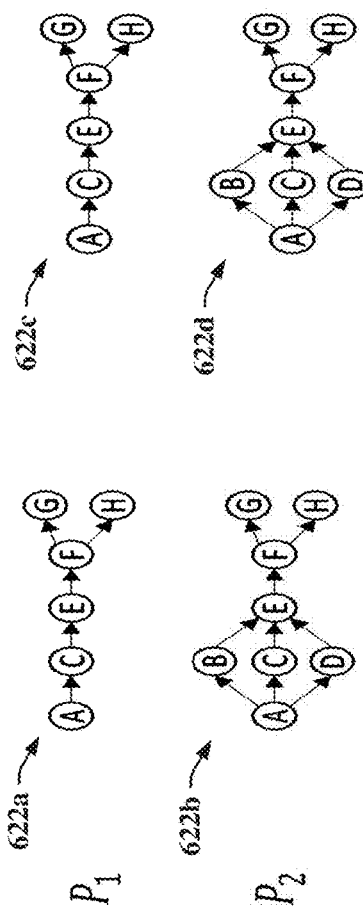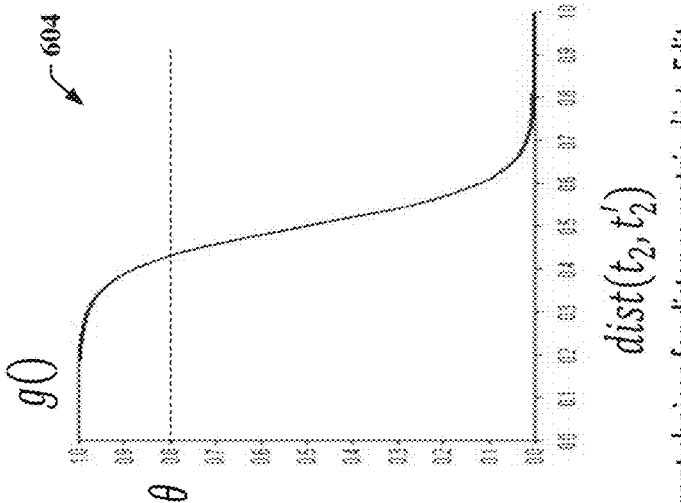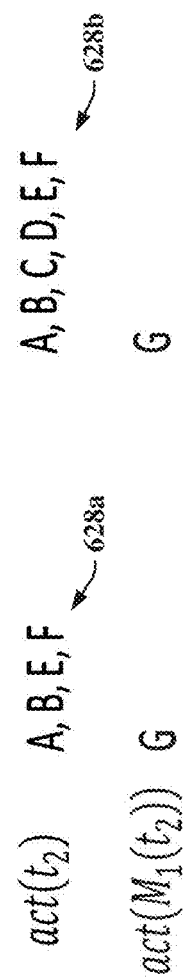
FIG. 6

MODEL TRANSFER LEARNING ACROSS EVOLVING PROCESSES

BACKGROUND

The subject disclosure relates to model transfer learning, and more specifically, to model transfer learning across evolving processes.

Currently, there are existing technologies (e.g., systems, techniques, algorithms, etc.) that enable model transfer learning. Some existing technologies employ a transfer learning technique to incrementally train a new model by leveraging knowledge gained in earlier training of an original model. Other existing technologies employ a boosting training data approach by making minor modifications to existing training data. Still other existing technologies employ concept drift algorithms to determine when a model is no longer making useful predictions. One application domain for machine learning is training prediction or classification models to make predictions or classifications about process flow. Typically, in this application domain, models are trained on sets of process execution traces, where each trace represents a sequence of events in a process. In this context, transfer learning techniques are relevant in the presence of evolving processes. A problem with such existing technologies described above is that when they are applied in the context of process flow, they are not process-aware, as they do not take into consideration connections to underlying changes in context such as, for instance, process model changes.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate model transfer learning across evolving processes are described.

According to an embodiment, a system can comprise a memory that stores computer executable components and a processor that executes the computer executable components stored in the memory. The computer executable components can comprise a condition definition component that defines one or more conditions associated with use of a model trained on first traces of a first process to make a prediction on one or more second traces of a second process. The computer executable components can further comprise a guardrail component that determines whether to use the model to make the prediction. An advantage of such a system is that it can facilitate use of the model to make the prediction on the one or more second traces of the second process without retraining the model using the one or more second traces as training data.

In some embodiments, the guardrail component further determines, based on the one or more conditions, a number of future process traces of the second process the model has an ability to service. An advantage of such a system is that it can facilitate estimating the extent to which the model can be used to make the prediction on the one or more second traces of the second process without retraining the model using the one or more second traces as training data.

According to another embodiment, a computer-implemented method can comprise defining, by a system operatively coupled to a processor, one or more conditions associated with use of a model trained on first traces of a first process to make a prediction on one or more second traces of a second process. The computer-implemented method can further comprise determining, by the system, whether to use the model to make the prediction. An advantage of such a computer-implemented method is that it can be implemented to facilitate use of the model to make the prediction on the one or more second traces of the second process without retraining the model using the one or more second traces as training data.

In some embodiments, the computer-implemented method above can further comprise determining, by the system, based on the one or more conditions, a number of future process traces of the second process the model has an ability to service. An advantage of such a computer-implemented method is that it can be implemented to facilitate estimating the extent to which the model can be used to make the prediction on the one or more second traces of the second process without retraining the model using the one or more second traces as training data.

According to another embodiment, a computer program product facilitating a model transfer learning process across evolving processes is provided. The computer program product comprising a computer readable storage medium having program instructions embodied therewith, the program instructions executable by a processor to cause the processor to define, by the processor, one or more conditions associated with use of a model trained on first traces of a first process to make a prediction on one or more second traces of a second process. The program instructions are further executable by the processor to cause the processor to determine, by the processor, whether to use the model to make the prediction. An advantage of such a computer program product is that it can be implemented to facilitate use of the model to make the prediction on the one or more second traces of the second process without retraining the model using the one or more second traces as training data.

In some embodiments, the program instructions of the computer program product above are further executable by the processor to cause the processor to determine, by the processor, based on the one or more conditions, a number of future process traces of the second process the model has an ability to service. An advantage of such a computer program product is that it can be implemented to facilitate estimating the extent to which the model can be used to make the prediction on the one or more second traces of the second process without retraining the model using the one or more second traces as training data.

DESCRIPTION OF THE DRAWINGS

FIGS. 3, 4, 5, and 6 illustrate example, non-limiting diagrams that can facilitate model transfer learning across evolving processes in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with existing model transfer learning technologies, the present disclosure can be implemented to produce a solution to these problems in the form of systems, computer-implemented methods, and/or computer program products that can define one or more conditions associated with use of a model trained on first traces of a first process to make a prediction on one or more second traces of a second process; and/or determine whether to use the model to make the prediction. An advantage of such systems, computer-implemented methods, and/or computer program products is that they can be implemented to facilitate use of the model to make the prediction on the one or more second traces of the second process without retraining the model using the one or more second traces as training data.

In some embodiments, the present disclosure can be implemented to produce a solution to these problems in the form of systems, computer-implemented methods, and/or computer program products that can determine, based on the one or more conditions, a number of future process traces of the second process the model has an ability to service. An advantage of such systems, computer-implemented methods, and/or computer program products is that they can be implemented to facilitate estimating the extent to which the model can be used to make the prediction on the one or more second traces of the second process without retraining the model using the one or more second traces as training data.

Figure 1:
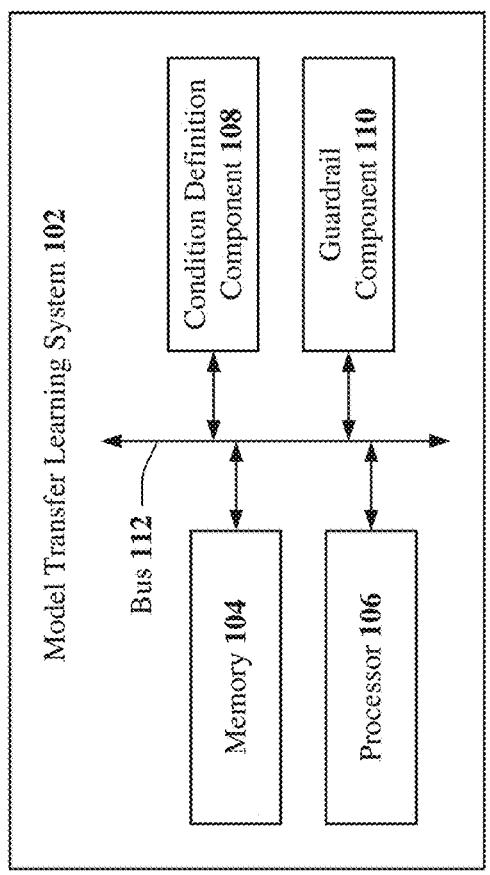
FIGS. 1 and 2 illustrate block diagrams of example, non-limiting systems that can facilitate model transfer learning across evolving processes in accordance with one or more embodiments described herein.

FIG. 1 illustrates a block diagram of an example, non-limiting system 100 that can facilitate model transfer learning across evolving processes in accordance with one or more embodiments described herein. System 100 can comprise a model transfer learning system 102, which can be associated with a cloud computing environment. For example, model transfer learning system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Model transfer learning system 102 and/or components thereof (e.g., condition definition component 108, guardrail component 110, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by model transfer learning system 102 and/or components thereof to execute one or more operations in accordance with one or more embodiments of the subject disclosure described herein. For instance, model transfer learning system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Model transfer learning system 102 can comprise a memory 104, a processor 106, a condition definition component 108, a guardrail component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or model transfer learning system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to model transfer learning system 102, condition definition component 108, guardrail component 110, and/or another component associated with model transfer learning system 102 as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Model transfer learning system 102, memory 104, processor 106, condition definition component 108, guardrail component 110, and/or another component of model transfer learning system 102 as described herein can be communicatively, electrically, operatively, and/or optically coupled to one another via a bus 112 to perform functions of system 100, model transfer learning system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Model transfer learning system 102 can comprise any type of component, machine, device, facility, apparatus, and/or instrument that comprises a processor and/or can be capable of effective and/or operative communication with a wired and/or wireless network. All such embodiments are envisioned. For example, model transfer learning system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Model transfer learning system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, model transfer learning system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, model transfer learning system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, model transfer learning system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between model transfer learning system 102 and external systems, sources, and/or devices (e.g., computing devices, communication devices, etc.).

Model transfer learning system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with model transfer learning system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, condition definition component 108, guardrail component 110, and/or any other components associated with model transfer learning system 102 as disclosed herein (e.g., communicatively, electronically, operatively, and/or optically coupled with and/or employed by model transfer learning system 102), can comprise such computer and/or machine readable, writable, and/or executable component(s) and/or instruction(s). Consequently, according to numerous embodiments, model transfer learning system 102 and/or any components associated therewith as disclosed herein, can employ processor 106 to execute such computer and/or machine readable, writable, and/or executable component(s) and/or instruction(s) to facilitate performance of one or more operations described herein with reference to model transfer learning system 102 and/or any such components associated therewith.

Model transfer learning system 102 can facilitate (e.g., via processor 106) performance of operations executed by and/or associated with condition definition component 108, guardrail component 110, and/or another component associated with model transfer learning system 102 as disclosed herein. For example, as described in detail below, model transfer learning system 102 can facilitate via processor 106 (e.g., a classical processor, a quantum processor, etc.): defining one or more conditions associated with use of a model trained on first traces of a first process to make a prediction on one or more second traces of a second process; and/or determining whether to use the model to make the prediction. In another example, as described in detail below, model transfer learning system 102 can further facilitate (e.g., via processor 106): analyzing one or more of the first traces, the one or more second traces, a process definition of the first process, and a process definition of the second process to determine whether to use the model to make the prediction; determining, based on the one or more conditions, a number of future process traces of the second process the model has an ability to service; and/or defining the one or more conditions to facilitate at least one of: improved application of the model; improved performance of the model; improved accuracy of the model in predicting an outcome in the second process; increased reusability of the model; or reduced computational costs of a processor (e.g., processor 106) that can be employed to implement the model to predict the outcome in the second process and/or to perform one or more of such operations described above. In another example, as described in detail below, the one or more conditions can correspond to one or more risks associated with using the model to make the prediction and model transfer learning system 102 can further facilitate (e.g., via processor 106) determining whether to use the model to make the prediction based on the one or more risks. In the examples above, the second process can comprise at least one of a modified version of the first process or a version of the first process developed after development of the first process.

To facilitate one or more of such operations described above that can be performed by model transfer learning system 102 and/or one or more components thereof (e.g., condition definition component 108, guardrail component 110, etc.), can leverage one or more functions associated with a model trained to make a prediction based on a process trace. For instance, as described below with reference to FIG. 2, model transfer learning system 102 and/or one or more components thereof (e.g., condition definition component 108, guardrail component 110, etc.) can leverage one or more functions associated with a model 210 of system 200.

Figure 2:
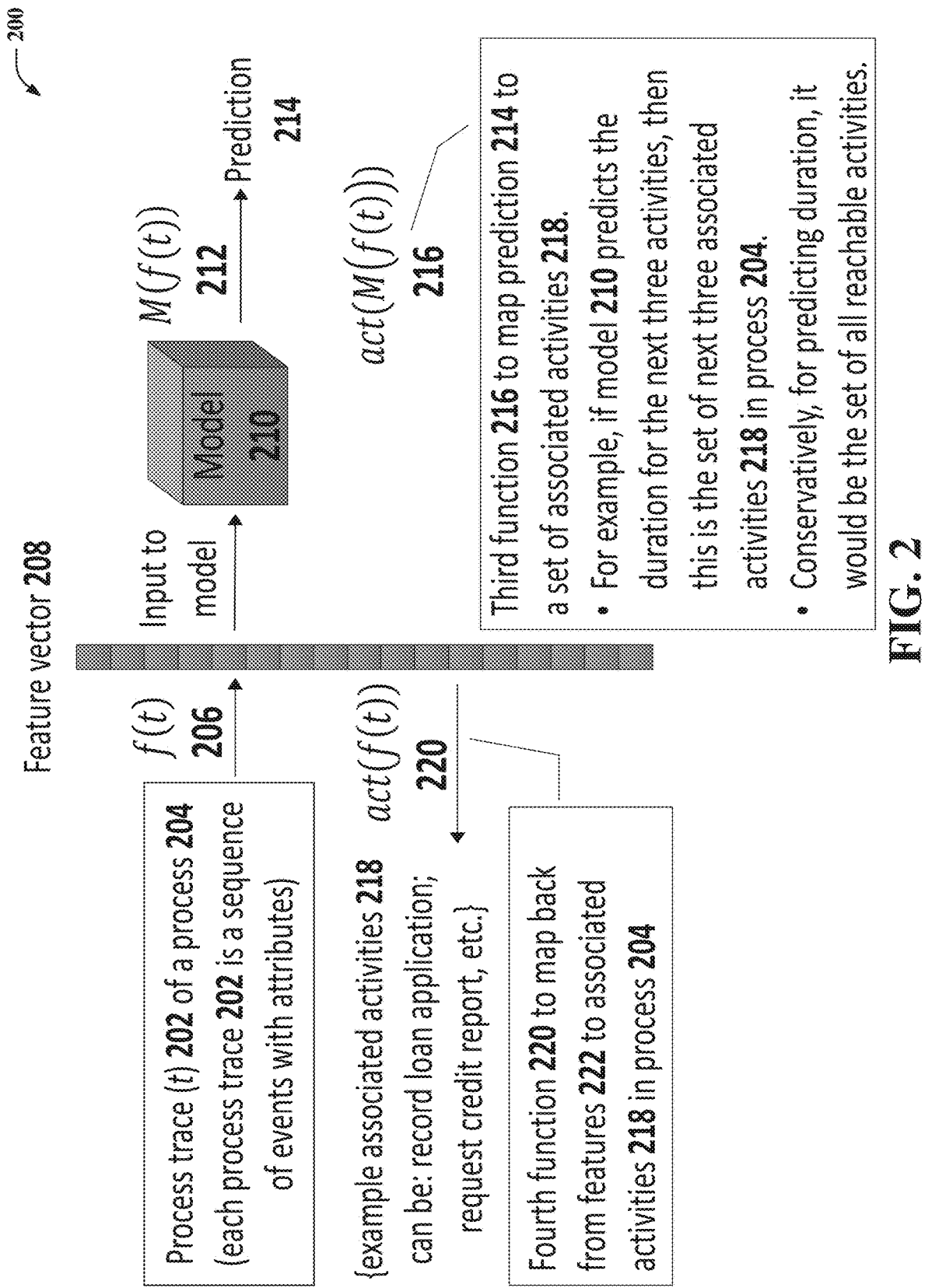

FIG. 2 illustrates a block diagram of an example, non-limiting system 200 that can facilitate model transfer learning across evolving processes in accordance with one or more embodiments described herein. Repetitive description of like elements and/or processes employed in respective embodiments is omitted for sake of brevity.

System 200 can comprise a model 210 that can be trained (e.g., via one or more supervised leaning techniques, unsupervised learning techniques, etc.) to make a prediction 214 based on a process trace 202 (denoted as process trace (t) in FIG. 2) of a process 204. As referenced herein and/or in the figures, a process trace can be defined as a sequence of events with attributes (e.g., a sequence of multi-dimensional activities).

In the non-limiting, example embodiment illustrated in FIG. 2, process 204 can comprise a business process such as, for instance, a process that can be implemented to approve or reject a loan application received by a financial lending entity (e.g., a bank). In the non-limiting, example embodiment illustrated in FIG. 2, process trace 202 can comprise a sequence of events with attributes such as, for instance, a timestamp, a responsible designation, a department designation, a trace designation, a resource designation, an activity designation, and/or a group designation. For instance, in the non-limiting example embodiment illustrated in FIG. 2, process trace 202 can comprise the following sequence of events with attributes that can be arranged as: timestamp, responsible, department, trace, resource, activity, group. It should be appreciated that the subject disclosure is not so limiting, as process 204 can comprise a variety of processes having a variety of process traces 202.

Process Trace 202

Nov. 25, 2015 10:16 AM, Resource21,General,Trace-10, Resource21,Record loan application,Group 1.

Nov. 28, 2015 03:10 PM, Resource21,General,Trace-10, Resource10,Request credit report,Group 4.

Nov. 30, 2015 11:00 AM, Resource21,General,Trace-10, Resource21,Review credit report,Group 1.

Dec. 4, 2015 12:30 PM, Resource21,General,Trace-10, Resource15,Review loan application,Group 1.

Dec. 5, 2015 10:00 AM, Resource21,General,Trace-10, Resource21,Send rejection,Group 4.

In the non-limiting, example embodiment illustrated in FIG. 2, a first function 206 (denoted as f(t) in FIG. 2) can be used (e.g., in an embedding process) to transform process trace 202 into a feature vector 208 (e.g., represented as a sequence of numbers, a matrix, etc.) that can be input to model 210. In the non-limiting, example embodiment illustrated in FIG. 2, first function 206 can comprise a deterministic function. In the non-limiting, example embodiment illustrated in FIG. 2, model 210 can comprise a machine learning (ML) model based on artificial intelligence (AI) including, but not limited to, a shallow or deep neural network model, a support vector machine (SVM) model, a classifier, a decision tree classifier, or any supervised or unsupervised machine learning model that can generate prediction 214 based on process trace 202.

In the non-limiting, example embodiment illustrated in FIG. 2, model 210 can comprise one or more of the models defined above that can use a second function 212 (denoted as M(f(t)) in FIG. 2) to make prediction 214. In the non-limiting, example embodiment illustrated in FIG. 2, prediction 214 can comprise, for instance, an outcome prediction, a duration prediction (e.g., duration to complete one or more tasks in process 204), a next task prediction, a path prediction, a decision, and/or another type of prediction.

In the non-limiting, example embodiment illustrated in FIG. 2, third function 216 (denoted as act(M(f(t))) in FIG. 2) can indicate activities associated with prediction 214. For instance, in the non-limiting, example embodiment illustrated in FIG. 2, if model 210 predicts the duration of the next three activities in process 204, then such activities can constitute the next three associated activities 218 in process 204 and third function 216 can thereby indicate the name and/or activity designations of such associated activities 218.

In the non-limiting, example embodiment illustrated in FIG. 2, fourth function 220 (denoted as act(f(t)) in FIG. 2) can indicate the activities associated with feature vector 208. For instance, in the non-limiting, example embodiment illustrated in FIG. 2, fourth function 220 can comprise a reverse deterministic function that can map back from features 222 of feature vector 208 to associated activities 218 in process 204. In the non-limiting, example embodiment illustrated in FIG. 2, such associated activities 218 can comprise one or more of the activity designations defined above in process trace 202 (e.g., record loan application, request credit report, review credit report, review loan application, etc.) and/or activities in another process trace of a different process.

Returning now to FIG. 1. As described below, model transfer learning system 102 and/or one or more components thereof (e.g., condition definition component 108, guardrail component 110, etc.) can leverage first function 206, second function 212, third function 216, and/or fourth function 220 to perform one or more operations of the subject disclosure in accordance with one or more embodiments described herein.

In some embodiments, for instance, as described below with reference to the non-limiting, example diagrams 300, 400, 500, and 600 illustrated in FIGS. 3, 4, 5, and 6, respectively, condition definition component 108 can leverage first function 206, second function 212, third function 216, and/or fourth function 220 to define one or more conditions (e.g., condition 302, 502, and/or 602) associated with use of a model trained on first traces of a first process to make a prediction on one or more second traces of a second process. In these embodiments, condition definition component 108 can further leverage first function 206, second function 212, third function 216, and/or fourth function 220 to define the one or more conditions to facilitate: improved application of the model; improved performance of the model; improved accuracy of the model in predicting an outcome in the second process; increased reusability of the model; and/or reduced computational costs of a processor (e.g., processor 106) that can be employed to implement the model to predict the outcome in the second process.

In some embodiments, for instance, as described below with reference to the non-limiting, example diagrams 300, 400, 500, and 600 illustrated in FIGS. 3, 4, 5, and 6, respectively, guardrail component 110 can leverage first function 206, second function 212, third function 216, and/or fourth function 220 to determine whether to use the model to make the prediction. In these embodiments, guardrail component 110 can further leverage first function 206, second function 212, third function 216, and/or fourth function 220 to analyze one or more of the first traces, the one or more second traces, a process definition of the first process, and a process definition of the second process to determine whether to use the model to make the prediction. In these embodiments, guardrail component 110 can leverage such functions defined above to determine whether to use the model to make the prediction based on one or more conditions that can correspond to one or more risks associated with using the model to make the prediction and guardrail component 110 can further leverage such functions to determine whether to use the model to make the prediction based on such one or more risks. In these embodiments, guardrail component 110 can further leverage first function 206, second function 212, third function 216, and/or fourth function 220 to determine, based on the one or more conditions, a number of future process traces of the second process the model has an ability to service.

Figure 3:
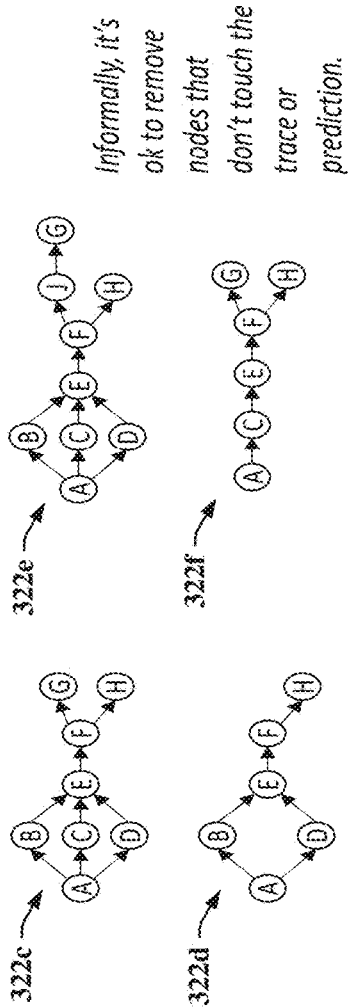

FIG. 3 illustrates an example, non-limiting diagram 300 that can facilitate model transfer learning across evolving processes in accordance with one or more embodiments described herein. Repetitive description of like elements and/or processes employed in respective embodiments is omitted for sake of brevity.

In the various non-limiting, example embodiments described herein and illustrated in the figures, condition definition component 108 can respectively define (e.g., via leveraging second function 212, third function 216, and/or fourth function 220) one or more conditions (e.g., condition 302, 502, and/or 602) associated with use of a model (e.g., model $M_1$) trained on first traces (e.g., first traces $t_1$) of a first process (e.g., first process $P_1$) to make a prediction on one or more second traces (e.g., second traces $t_2$) of a second process (e.g., second process $P_2$). For example, with reference to diagram 300 illustrated in FIG. 3, condition definition component 108 can define condition 302 (e.g., via leveraging second function 212, third function 216, and/or fourth function 220). In this example, as defined in diagram 300, condition 302 can describe that a model 304 (denoted as $M_1$ in FIG. 3, also referred to herein as model $M_1$) trained on first traces 306 (denoted as $t_1$ in FIG. 3, also referred to herein as first traces $t_1$) of a first process 308 (denoted as $P_1$ in FIG. 3, also referred to herein as first process $P_1$) can be used to make a prediction 310 on one or more second traces 312 (denoted as $t_2$ in FIG. 3, also referred to herein as one or more second traces $t_2$) of a second process 314 (denoted as $P_2$ in FIG. 3, also referred to herein as second process $P_2$) if and only if (iff) second trace $t_2$ conforms to first process $P_1$ and all associated activities 316 (denoted as act($M_1(t_2)$) in FIG. 3, also referred to herein as associated activities act($M_1(t_2)$)) are reachable (e.g., as defined below) in second process $P_2$ along the same paths (e.g., the same paths in a directed graph) as those in first process $P_1$. As referenced herein, second trace $t_2$ conforms to second process $P_2$ if second trace $t_2$ is a possible path in first process $P_1$. As referenced herein, reachability can be defined as follows: given a partial trace t, an activity X, and a process P, activity X is reachable from t in P iff there exists a partial trace t' that conforms to P where t is a prefix of t' and X is the last activity in t'.

In the various non-limiting, example embodiments described herein and illustrated in the figures: model $M_1$ can comprise model 210 described above with reference to the non-limiting, example embodiment illustrated in FIG. 2 or another model (e.g., another machine learning model, another artificial intelligence model, etc.); first traces $t_1$ can comprise process traces 202 described above with reference to the non-limiting, example embodiment illustrated in FIG. 2 or process traces of another process; first process $P_1$ can comprise process 204 described above with reference to the non-limiting, example embodiment illustrated in FIG. 2 or another process; associated activities act($M_1(t_2)$) can comprise associated activities 218 described above with reference to the non-limiting, example embodiment illustrated in FIG. 2 or other associated activities of another process; second process $P_2$ can comprise at least one of a modified version of first process $P_1$ or a version of first process $P_1$ developed after development of first process $P_1$ (e.g., an updated or newer version of first process $P_1$); second traces $t_2$ can comprise traces of second process $P_2$, for instance, second traces $t_2$ can comprise one or more of first traces $t_1$ or one or more other traces; and/or prediction 310 can comprise a prediction made by model $M_1$ using one or more second traces $t_2$ of second process $P_2$ (e.g., prediction 310 can comprise an outcome prediction, a duration prediction (e.g., duration to complete one or more tasks in second process $P_2$), a next task prediction, a path prediction, a decision, and/or another type of prediction).

In the non-limiting, example embodiment illustrated in FIG. 3, condition 302 can correspond to one or more risks 318 associated with using model $M_1$ to make prediction 310 on one or more second traces $t_2$ of second process $P_2$. In this example embodiment, such one or more risks 318 can comprise risks associated with one or more levels of accuracy corresponding to prediction 310. For instance, in the non-limiting, example embodiment illustrated in FIG. 3, condition 302 can comprise a relatively strong condition that, when satisfied, can be indicative of relatively low risk in using model $M_1$ to make prediction 310 on one or more second traces $t_2$ of second process $P_2$, and when not satisfied, can be indicative of relatively high risk in using model $M_1$ to make prediction 310 on one or more second traces $t_2$ of second process $P_2$. In this example embodiment, such relatively low risk can be indicative of a relatively high level of accuracy corresponding to prediction 310 and such relatively high risk can be indicative of a relatively low level of accuracy corresponding to prediction 310.

As illustrated in the example embodiment depicted in FIG. 3, diagram 300 can further comprise one or more cases 320 (denoted as Case 1, Case 2, and Case 3 in FIG. 3) that can comprise examples of how first process $P_1$ can be modified and/or updated to yield second process $P_2$. In this example embodiment, each of such cases 320 can respectively comprise graphs such as, for instance, directed graphs that can comprise visual representations of first process $P_1$ and second process $P_2$. For instance, as illustrated in the example embodiment depicted in FIG. 3: Case 1 can comprise graphs 322a and 322b that can comprise visual representations of first process $P_1$ and second process $P_2$, respectively; Case 2 can comprise graphs 322c and 322d that can comprise visual representations of first process $P_1$ and second process $P_2$, respectively; and Case 3 can comprise graphs 322e and 322f that can comprise visual representations of first process $P_1$ and second process $P_2$, respectively. In the example embodiment depicted in FIG. 3, graphs 322a, 322b, 322c, 322d, 322e, and/or 322f can comprise directed graphs having some or all of nodes 324 denoted as A, B, C, D, E, F, G, H, and J in FIG. 3, where such nodes 324 can represent activities (e.g., associated activities act($M_1(t_2)$)) in first process $P_1$ or second process $P_2$ and edges 326 (depicted as arrows in FIG. 3) that can represent relationships between such nodes. In this example embodiment, such nodes 324 and edges 326 can be combined to form one or more paths that can represent one or more sequences of activities (e.g., associated activities act($M_1(t_2)$)) in first process $P_1$ or second process $P_2$. In this example embodiment, such one or more sequences can comprise first traces $t_1$ in first process $P_1$ or second traces $t_2$ in second process $P_2$.

As illustrated in the example embodiment depicted in FIG. 3, Case 1, Case 2, and Case 3 can comprise examples of how first process $P_1$ can be modified and/or updated to yield second process $P_2$ by removing one or more nodes 324 and/or one or more edges 326 from graphs 322a, 322c, and 322e to yield graphs 322b, 322d, and 322f, respectively. For instance, as illustrated in the example embodiment depicted in FIG. 3: in Case 1, graph 322b can comprise a modified and/or updated version of graph 322a, where node C has been removed from graph 322a to yield graph 322b; in Case 2, graph 322d can comprise a modified and/or updated version of graph 322c, where nodes C and G have been removed from graph 322c to yield graph 322d; and in Case 3, graph 322f can comprise a modified and/or updated version of graph 322e, where nodes B, D, and J have been removed from graph 322e to yield graph 322f. In this example embodiment, guardrail component 110 can evaluate Case 1, Case 2, and Case 3 to determine whether one or more of such cases satisfy condition 302 defined above with respect to a certain second trace $t_2$ of second process $P_2$.

In an example, guardrail component 110 can evaluate graphs 322a and 322b of Case 1 with respect to a certain second trace $t_2$ designated as trace 328a and denoted as A, B, E, F in FIG. 3, where such a trace 328a can comprise a second trace $t_2$ of second process $P_2$ and all of the activities in trace 328a can be expressed as act($t_2$) as illustrated in FIG. 3. For instance, guardrail component 110 can evaluate graphs 322a and 322b of Case 1 with respect to trace 328a to determine whether trace 328a is a possible path in graph 322a and whether all associated activities act($M_1(t_2)$) corresponding to node G are reachable in graph 322b along the same paths as those in graph 322a. In this example, as illustrated in FIG. 3, based on such evaluation, guardrail component 110 can determine that, in Case 1, trace 328a of second process $P_2$ satisfies condition 302, and thus, there is relatively low risk (denoted as safe in FIG. 3) in using model $M_1$ to make prediction 310 on trace 328a of second process $P_2$. In this example, as described above, such relatively low risk can be indicative of a relatively high level of accuracy corresponding to prediction 310 when model $M_1$ is used to make prediction 310 on trace 328a in Case 1.

In another example, guardrail component 110 can evaluate graphs 322c and 322d of Case 2 with respect to trace 328a. For instance, guardrail component 110 can evaluate graphs 322c and 322d of Case 2 with respect to trace 328a to determine whether trace 328a is a possible path in graph 322a and whether all associated activities act($M_1(t_2)$) corresponding to node G are reachable in graph 322d along the same paths as those in graph 322c. In this example, as illustrated in FIG. 3, based on such evaluation, guardrail component 110 can determine that, in Case 2, trace 328a of second process $P_2$ does not satisfy condition 302, as all associated activities act($M_1(t_2)$) corresponding to node G are not reachable in graph 322d along the same paths as those in graph 322c due to the removal of node G from graph 322c (e.g., due to the absence of node G in graph 322d). In this example, therefore, there is relatively high risk (denoted as unsafe in FIG. 3) in using model $M_1$ to make prediction 310 on trace 328a of second process $P_2$, and as described above, such relatively high risk can be indicative of a relatively low level of accuracy corresponding to prediction 310 when model $M_1$ is used to make prediction 310 on trace 328a in Case 2.

In another example, guardrail component 110 can evaluate graphs 322e and 322f of Case 3 with respect to a certain second trace $t_2$ designated as trace 328b and denoted as A, C, E, F in FIG. 3, where such a trace 328b can comprise a second trace $t_2$ of second process $P_2$ and all of the activities in trace 328b can be expressed as act($t_2$) as illustrated in FIG. 3. For instance, guardrail component 110 can evaluate graphs 322e and 322f of Case 3 with respect to trace 328b to determine whether trace 328b is a possible path in graph 322e and whether all associated activities act($M_1(t_2)$) corresponding to node G are reachable in graph 322f along the same paths as those in graph 322e. In this example, as illustrated in FIG. 3, based on such evaluation, guardrail component 110 can determine that, in Case 3, trace 328b of second process $P_2$ does not satisfy condition 302, as the path to node G in graph 322f is not the same as in graph 322e and thus, all associated activities act($M_1(t_2)$) corresponding to node G are not reachable in graph 322f along the same paths as those in graph 322e due to the removal of node J from graph 322e (e.g., due to the absence of node J between node F and node G in graph 322e). In this example, therefore, there is relatively high risk (denoted as unsafe in FIG. 3) in using model $M_1$ to make prediction 310 on trace 328b of second process $P_2$, and as described above, such relatively high risk can be indicative of a relatively low level of accuracy corresponding to prediction 310 when model $M_1$ is used to make prediction 310 on trace 328b in Case 3.

Figure 4:
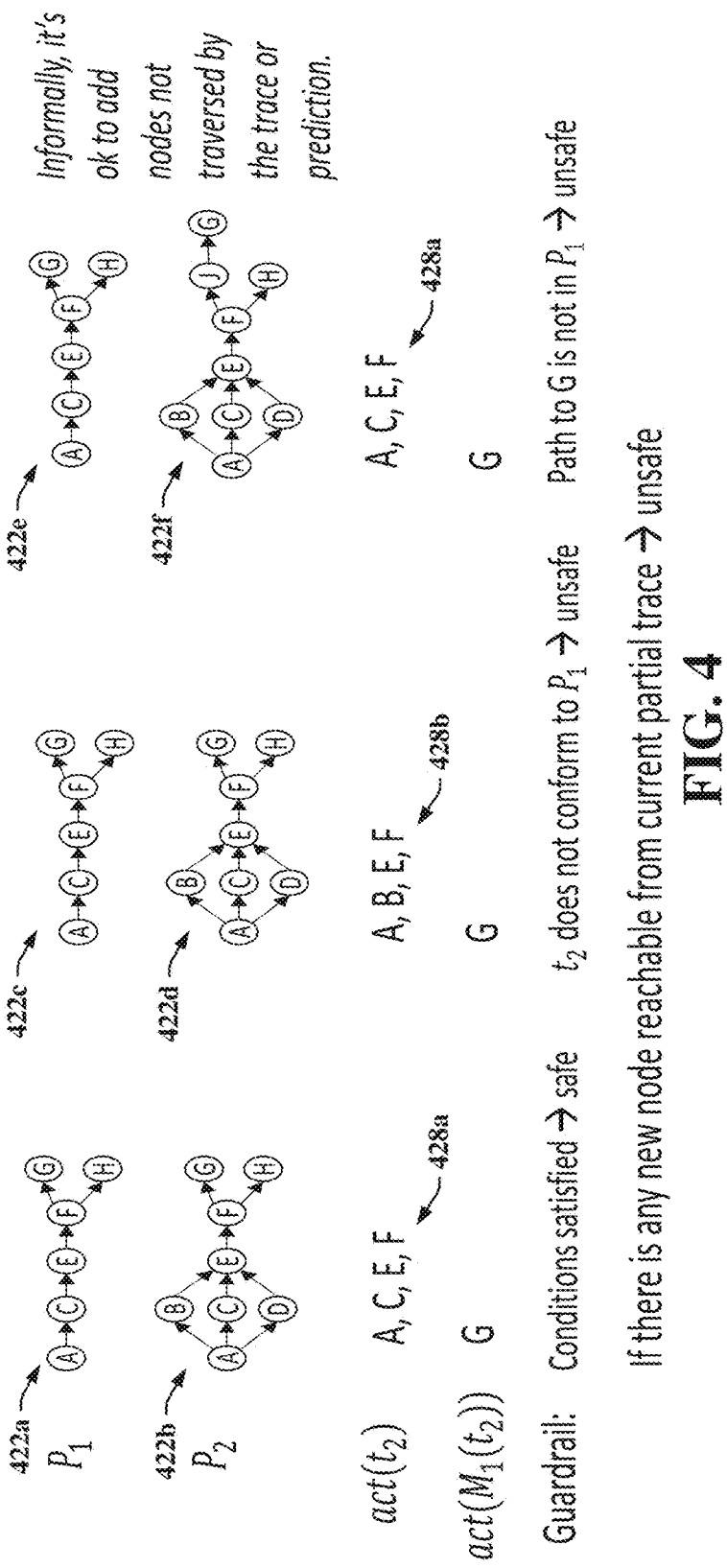

FIG. 4 illustrates an example, non-limiting diagram 400 that can facilitate model transfer learning across evolving processes in accordance with one or more embodiments described herein. Repetitive description of like elements and/or processes employed in respective embodiments is omitted for sake of brevity.

Diagram 400 illustrated in the example embodiment depicted in FIG. 4 can comprise an example, non-limiting alternative embodiment of diagram 300, where diagram 400 can comprise Case 4, Case 5, and Case 6 as cases 320. In this example embodiment, Case 4, Case 5, and Case 6 can comprise example, non-limiting alternative embodiments of Case 1, Case 2, and Case 3, respectively. In this example embodiment, Case 4, Case 5, and Case 6 can respectively comprise graphs 422a and 422b, graphs 422c and 422d, and graphs 422e and 422f. In this example embodiment, graphs 422a, 422b, 422c, 422d, 422e, and 422f can respectively comprise example, non-limiting alternative embodiments of graphs 322a, 322b, 322c, 322d, 322e, and/or 322f, where graphs 422a, 422b, 422c, 422d, 422e, and/or 422f can comprise some or all of nodes 324 denoted as A, B, C, D, E, F, G, H, and J in FIG. 4.

As illustrated in the example embodiment depicted in FIG. 4, Case 4, Case 5, and Case 6 can comprise examples of how first process $P_1$ can be modified and/or updated to yield second process $P_2$ by adding one or more nodes 324 and/or one or more edges 326 to graphs 422a, 422c, and 422e to yield graphs 422b, 422d, and 422f, respectively. For instance, as illustrated in the example embodiment depicted in FIG. 4: in Case 4, graph 422b can comprise a modified and/or updated version of graph 422a, where nodes B and D have been added to graph 422a to yield graph 422b; in Case 5, graph 422d can comprise a modified and/or updated version of graph 422c, where nodes B and D have been added to graph 422c to yield graph 422d; and in Case 6, graph 422f can comprise a modified and/or updated version of graph 422e, where nodes B, D, and J have been added to graph 422e to yield graph 422f. In this example embodiment, guardrail component 110 can evaluate Case 4, Case 5, and Case 6 to determine whether one or more of such cases satisfy condition 302 defined above with respect to a certain second trace $t_2$ of second process $P_2$.

In an example, guardrail component 110 can evaluate graphs 422a and 422b of Case 4 with respect to a certain second trace $t_2$ designated as trace 428a and denoted as A, C, E, F in FIG. 4, where such a trace 428a can comprise a second trace $t_2$ of second process $P_2$ and all of the activities in trace 428a can be expressed as act($t_2$) as illustrated in FIG. 4. For instance, guardrail component 110 can evaluate graphs 422a and 422b of Case 4 with respect to trace 428a to determine whether trace 428a is a possible path in graph 422a and whether all associated activities act($M_1(t_2)$) corresponding to node G are reachable in graph 422b along the same paths as those in graph 422a. In this example, as illustrated in FIG. 4, based on such evaluation, guardrail component 110 can determine that, in Case 4, trace 428a of second process $P_2$ satisfies condition 302, and thus, there is relatively low risk (denoted as safe in FIG. 4) in using model $M_1$ to make prediction 310 on trace 428a of second process $P_2$. In this example, as described above, such relatively low risk can be indicative of a relatively high level of accuracy corresponding to prediction 310 when model $M_1$ is used to make prediction 310 on trace 428a in Case 4.

In another example, guardrail component 110 can evaluate graphs 422c and 422d of Case 5 with respect to trace 428a. For instance, guardrail component 110 can evaluate graphs 422c and 422d of Case 5 with respect to a certain second trace $t_2$ designated as trace 428b and denoted as A, B, E, F in FIG. 4, where such a trace 428b can comprise a second trace $t_2$ of second process $P_2$ and all of the activities in trace 428b can be expressed as act($t_2$) as illustrated in FIG. 4. For instance, guardrail component 110 can evaluate graphs 422c and 422d of Case 5 with respect to trace 428b to determine whether trace 428b is a possible path in graph 422c and whether all associated activities act($M_1(t_2)$) corresponding to node G are reachable in graph 422d along the same paths as those in graph 422c. In this example, as illustrated in FIG. 4, based on such evaluation, guardrail component 110 can determine that, in Case 5, trace 428b of second process $P_2$ does not satisfy condition 302, as trace 428b does not conform to first process $P_1$, as node B is not present in graph 422c. In this example, therefore, there is relatively high risk (denoted as unsafe in FIG. 4) in using model $M_1$ to make prediction 310 on trace 428b of second process $P_2$, and as described above, such relatively high risk can be indicative of a relatively low level of accuracy corresponding to prediction 310 when model $M_1$ is used to make prediction 310 on trace 428b in Case 5.

In another example, guardrail component 110 can evaluate graphs 422e and 422f of Case 6 with respect to trace 428a. For instance, guardrail component 110 can evaluate graphs 422e and 422f of Case 6 with respect to trace 428a to determine whether trace 428a is a possible path in graph 422e and whether all associated activities act($M_1(t_2)$) corresponding to node G are reachable in graph 422f along the same paths as those in graph 422e. In this example, as illustrated in FIG. 4, based on such evaluation, guardrail component 110 can determine that, in Case 6, trace 428a of second process $P_2$ does not satisfy condition 302, as the path to node G in graph 422f is not the same as in graph 422e and thus, all associated activities act($M_1(t_2)$) corresponding to node G are not reachable in graph 422f along the same paths as those in graph 422e due to the addition of node J to graph 422e (e.g., due to the addition of node J between node F and node G in graph 422e). In this example, therefore, there is relatively high risk (denoted as unsafe in FIG. 4) in using model $M_1$ to make prediction 310 on trace 428a of second process $P_2$, and as described above, such relatively high risk can be indicative of a relatively low level of accuracy corresponding to prediction 310 when model $M_1$ is used to make prediction 310 on trace 428a in Case 6.

FIG. 5 illustrates an example, non-limiting diagram 500 that can facilitate model transfer learning across evolving processes in accordance with one or more embodiments described herein. Repetitive description of like elements and/or processes employed in respective embodiments is omitted for sake of brevity.

In the non-limiting, example embodiment described below and illustrated in FIG. 5, condition definition component 108 can define (e.g., via leveraging second function 212, third function 216, and/or fourth function 220) condition 502, which can comprise an example, non-limiting alternative embodiment of condition 302. For instance, condition 502 can correspond to one or more risks 318 associated with using model $M_1$ to make prediction 310 on one or more second traces $t_2$ of second process $P_2$. In this example embodiment, as described above with reference to FIG. 3, such one or more risks 318 can comprise risks associated with one or more levels of accuracy corresponding to prediction 310. For instance, in the non-limiting, example embodiment illustrated in FIG. 5, condition 502 can comprise a relatively weak condition that, when satisfied, can be indicative of relatively moderate risk in using model $M_1$ to make prediction 310 on one or more second traces $t_2$ of second process $P_2$, and when not satisfied, can be indicative of relatively high risk in using model $M_1$ to make prediction 310 on one or more second traces $t_2$ of second process $P_2$. In this example embodiment, such relatively moderate risk can be indicative of a relatively moderate level of accuracy corresponding to prediction 310 and such relatively high risk can be indicative of a relatively low level of accuracy corresponding to prediction 310.

In the example embodiment illustrated in FIG. 5, as defined in diagram 500, condition 502 can describe that model $M_1$ trained on first traces $t_1$ of first process $P_1$ can be used to make prediction 310 on one or more second traces $t_2$ of second process $P_2$ if and only if (iff) the activities act($t_2$) in second trace $t_2$ are a superset ($\supseteq$) of the features (f̂) in model $M_1$ (f̂($M_1$)) that contribute most (e.g., relative to other features) to a prediction (e.g., prediction 214) on first traces $t_1$ of first process $P_1$ and all associated activities act($M_1(t_2)$) are reachable (e.g., as defined above with reference to FIG. 3) in second process $P_2$ along the same paths (e.g., the same paths in a directed graph) as those in first process $P_1$. In this example embodiment, as defined in diagram 500, second trace $t_2$ can be a second trace 312 from second process $P_2$, where the activities in first process $P_1$ (denoted as act($P_1$) in FIG. 5) are a superset ($\supseteq$) of the activities in second process $P_2$ (denoted as act ($P_2$) in FIG. 5).

Diagram 500 illustrated in the example embodiment depicted in FIG. 5 can comprise an example, non-limiting alternative embodiment of diagram 300 and/or 400, where diagram 500 can comprise Case 7 and Case 8 as cases 320. In this example embodiment, Case 7 and Case 8 can comprise example, non-limiting alternative embodiments of Case 1, Case 2, Case 3, Case 4, and/or Case 5. In this example embodiment, Case 7 and Case 8 can respectively comprise graphs 522a and 522b and graphs 522c and 522d. In this example embodiment, graphs 522a, 522b, 522c, and 522d can respectively comprise example, non-limiting alternative embodiments of graphs 322a, 322b, 322c, 322d, 322e, and/or 322f of diagram 300 and/or graphs 422a, 422b, 422c, 422d, 422e, and/or 422f of diagram 400, where graphs 522a, 522b, 522c, and/or 522d can comprise some or all of nodes 324 denoted as A, C, E, F, G, and H in FIG. 5.

As illustrated in the example embodiment depicted in FIG. 5, Case 7 and Case 8 can comprise examples of how first process $P_1$ can be modified and/or updated to yield second process $P_2$ by removing one or more nodes 324 and/or one or more edges 326 from graphs 522a and 522c to yield graphs 522b and 422d, respectively. For instance, as illustrated in the example embodiment depicted in FIG. 5: in Case 7, graph 522b can comprise a modified and/or updated version of graph 522a, where node C has been removed from graph 522a to yield graph 522b; and in Case 8, graph 522d can comprise a modified and/or updated version of graph 522c, where node C has been removed from graph 522c to yield graph 522d. In this example embodiment, guardrail component 110 can evaluate Case 7 and Case 8 to determine whether either or both such cases satisfy condition 502 defined above with respect to a certain second trace $t_2$ of second process $P_2$.

In evaluating Case 7 of the example embodiment illustrated in FIG. 5, guardrail component 110 can determine that node A is the activity act ($\hat{f}(M_1)$) in graph 522a that contributes most (e.g., relative to other features) to a prediction (e.g., prediction 214) denoted as node G in FIG. 5. In evaluating Case 8 of the example embodiment illustrated in FIG. 5, guardrail component 110 can determine that nodes A and C are the activities act ($\hat{f}(M_1)$) in graph 522c that contribute most (e.g., relative to other features) to a prediction (e.g., prediction 214) denoted as node G in FIG. 5. To facilitate such evaluations, guardrail component 110 can employ one or more model prediction explanation and/or interpretability techniques to determine which activity or activities (act ($\hat{f}(M_1)$)) in graph 522a and/or 522c contribute(s) most (e.g., relative to other features) to a prediction (e.g., prediction 214) denoted as node G in FIG. 5. For example, guardrail component 110 can employ one or more model prediction explanation and/or interpretability techniques including, but not limited to, a permutation feature importance (PFI) technique, an attention mechanism (e.g., an attention long short-term memory (LSTM)), a count features in a decision forest technique (e.g., with XGBoost), a count features in a decision stump technique (e.g., with XGBoost), and/or another model prediction explanation and/or interpretability technique.

In an example, guardrail component 110 can evaluate graphs 522a and 522b of Case 7 with respect to a certain second trace $t_2$ designated as trace 528a and denoted as A, E, F in FIG. 5, where such a trace 528a can comprise a second trace $t_2$ of second process $P_2$ and all the activities in trace 528a can be expressed as act($t_2$) as illustrated in FIG. 5. For instance, guardrail component 110 can evaluate graphs 522a and 522b of Case 7 with respect to trace 528a to determine whether the activities act($t_2$) in trace 528a are a superset ($\supseteq$) of the features ($\hat{f}$) in model $M_1$ ($\hat{f}(M_1)$) that contribute most (e.g., relative to other features) to a prediction (e.g., prediction 214) on first traces $t_1$ of first process $P_1$ and whether all associated activities act($M_1(t_2)$) corresponding to node G are reachable in graph 522b along the same paths as those in graph 522a. In this example, as illustrated in FIG. 5, based on such evaluation, guardrail component 110 can determine that, in Case 7, although trace 528a of second process $P_2$ does not conform to first process $P_1$ due to the absence of node C in graph 522b, trace 528a satisfies condition 502 because the activity represented as node A is the activity that contributes most to the prediction represented in FIG. 5 as node G and node A is present in both graph 522a and 522b. In this example, therefore, there is relatively moderate risk (denoted as statistically safe in FIG. 5) in using model $M_1$ to make prediction 310 on trace 528a of second process $P_2$. In this example, as described above, such relatively moderate risk can be indicative of a relatively moderate level of accuracy corresponding to prediction 310 when model $M_1$ is used to make prediction 310 on trace 528a in Case 7.

In another example, guardrail component 110 can evaluate graphs 522c and 522d of Case 8 with respect to trace 528a. For instance, guardrail component 110 can evaluate graphs 522c and 522d of Case 8 with respect to trace 528a to determine whether the activities act($t_2$) in trace 528a are a superset ($\supseteq$) of the features ($\hat{f}$) in model $M_1$ ($\hat{f}(M_1)$) that contribute most (e.g., relative to other features) to a prediction (e.g., prediction 214) on first traces $t_1$ of first process $P_1$ and whether all associated activities act($M_1(t_2)$) corresponding to node G are reachable in graph 522d along the same paths as those in graph 522c. In this example, as illustrated in FIG. 5, based on such evaluation, guardrail component 110 can determine that, in Case 8, trace 528a of second process $P_2$ does not conform to first process $P_1$ due to the absence of node C in graph 522b. In this example, guardrail component 110 can further determine that, in Case 8, trace 528a of second process $P_2$ does not satisfy condition 502 because the activities represented as nodes A and C are the activities that contribute most to the prediction represented in FIG. 5 as node G but node C is not present in graph 522d. In this example, therefore, there is relatively high risk (denoted as unsafe in FIG. 5) in using model $M_1$ to make prediction 310 on trace 528a of second process $P_2$. In this example, as described above, such relatively high risk can be indicative of a relatively low level of accuracy corresponding to prediction 310 when model $M_1$ is used to make prediction 310 on trace 528a in Case 8.

FIG. 6 illustrates an example, non-limiting diagram 600 that can facilitate model transfer learning across evolving processes in accordance with one or more embodiments described herein. Repetitive description of like elements and/or processes employed in respective embodiments is omitted for sake of brevity.

As defined in diagram 600 of the non-limiting, example embodiment described below and illustrated in FIG. 6, second trace $t_2$ can be a second trace 312 from second process $P_2$, where the activities in first process $P_1$ (denoted as act($P_1$) in FIG. 6) are a subset ($\subseteq$) of the activities in second process $P_2$ (denoted as act ($P_2$) in FIG. 6). In this example embodiment, as defined in diagram 600, a second trace t'$_2$ can be a transformation of second trace $t_2$ that conforms to first process $P_1$ as defined above with reference to FIG. 3.

In the non-limiting, example embodiment illustrated in FIG. 6, condition definition component 108 can define (e.g., via leveraging second function 212, third function 216, and/or fourth function 220) condition 602, which can comprise an example, non-limiting alternative embodiment of condition 502. For instance, in the example embodiment illustrated in FIG. 6, condition 602 can correspond to one or more risks 318 associated with using model $M_1$ to make prediction 310 on one or more second traces $t_2$ of second process $P_2$. In this example embodiment, as described above with reference to FIG. 3, such one or more risks 318 can comprise risks associated with one or more levels of accuracy corresponding to prediction 310. For instance, in the non-limiting, example embodiment illustrated in FIG. 6, condition 602 can comprise a relatively weak condition that, when satisfied, can be indicative of relatively moderate risk in using model $M_1$ to make prediction 310 on one or more second traces $t_2$ of second process $P_2$, and when not satisfied, can be indicative of relatively high risk in using model $M_1$ to make prediction 310 on one or more second traces $t_2$ of second process $P_2$. In this example embodiment, such relatively moderate risk can be indicative of a relatively moderate level of accuracy corresponding to prediction 310 and such relatively high risk can be indicative of a relatively low level of accuracy corresponding to prediction 310.

In the example embodiment illustrated in FIG. 6, as defined in diagram 600, condition 602 can describe that model $M_1$ trained on first traces $t_1$ of first process $P_1$ can be used to make prediction 310 on one or more second traces $t_2$ of second process $P_2$ if a calculated distance between second trace $t_2$ and a transformed second trace 630 (denoted in FIG. 6 as $t'_2$, also referred to herein as transformed second trace $t'_2$) is small enough to justify use of model $M_1$ to make prediction 310 on second trace $t_2$ (e.g., when the distance between second trace $t_2$ and transformed second trace $t'_2$ is small enough that there is relatively moderate risk in using model $M_1$ to make prediction 310 on second trace $t_2$). For instance, as defined in diagram 600, condition definition component 108 can define condition 602 as $$g\left(\min_{t_2} dist(t_2, t'_2)\right) > \theta,$$

second trace $t_2$ can comprise trace 628a or trace 628b denoted as A, B, E, F and A, B, C, D, E, F, respectively, in FIG. 6, where trace 628a or trace 628b can comprise a second trace $t_2$ of second process $P_2$ and all the activities in trace 628a or trace 628b can be expressed as $act(t_2)$ as illustrated in FIG. 6;

transformed second trace $t'_2$ can comprise transformed second trace 630 denoted as A, C, E, F in FIG. 6;

distance $dist(t_2, t'_2)$ can denote the distance between second trace $t_2$ (e.g., trace 628a) and transformed second trace $t'_2$ that can be calculated (e.g., by guardrail component 110) using a distance function (e.g., edit distance, path centrality, and/or alpha dominance as described below); and/or g( ) can denote a function that can be used by, for instance, guardrail component 110 to determine whether the distance $dist(t_2, t'_2)$ between second trace $t_2$ (e.g., trace 628a) and transformed second trace $t'_2$ is above, at, or below a certain threshold $\theta$ as illustrated by plot 604 depicted in FIG. 6.

In the example above, an entity implementing model transfer learning system 102 can utilize an interface component (not illustrated in the figures) of model transfer learning system 102 (e.g., an application programming interface (API), a representational state transfer API, a graphical user interface (GUI), etc.) to define g( ) and $\theta$. In several embodiments, such an entity can include, but not limited to, a human, a client, a user, a computing device, a software application, an agent, a machine learning (ML) model, an artificial intelligence (AI) model, and/or another entity.

In the example above, distance $dist(t_2, t'_2)$ can be calculated by, for instance, guardrail component 110 using, for example:

edit distance, where all nodes are equally important;
graph centrality measures (e.g., Betweenness, PageRank, Percolation, etc.), where given a trace $t_2$, for every node X in $P_2$ and not $P_1$, C(X) is the centrality measure of a node X and $d_{P_1,P_2} = \Sigma_{X \in t_2} C(X)$, X in $P_2$ and not $P_1$; and/or alpha dominance, where given a trace $t_2$ and the last activity in $t_2$ is Y, for a node X in $P_2$ and not in $P_1$, T=number of unique paths in $P_2$ that end in Y and D=number of unique paths in $P_2$ that end in Y and include X, $$\alpha_X(t_2) = \frac{D}{T}$$

and $\alpha_{P_1,P_2} = \Sigma_{X \in t_2} \alpha_X(t_2)$.

Diagram 600 illustrated in the example embodiment depicted in FIG. 6 can comprise an example, non-limiting alternative embodiment of diagram 500, where diagram 600 can comprise Case 9 and Case 10 as cases 320. In this example embodiment, Case 9 and Case 10 can comprise example, non-limiting alternative embodiments of Case 7 and Case 8. In this example embodiment, Case 9 and Case 10 can respectively comprise graphs 622a and 622b and graphs 622c and 622d. In this example embodiment, graphs 622a, 622b, 622c, and 622d can respectively comprise example, non-limiting alternative embodiments of graphs 522a, 522b, 522c, and 522d of diagram 500, where graphs 622a, 622b, 622c, and/or 622d can comprise some or all of nodes 324 denoted as A, B, C, D, E, F, G, and H in FIG. 6.

As illustrated in the example embodiment depicted in FIG. 6, Case 9 and Case 10 can comprise examples of how first process $P_1$ can be modified and/or updated to yield second process $P_2$ by adding one or more nodes 324 and/or one or more edges 326 to graphs 622a and 622c to yield graphs 622b and 622d, respectively. For instance, as illustrated in the example embodiment depicted in FIG. 6: in Case 9, graph 622b can comprise a modified and/or updated version of graph 622a, where nodes B and D have been added to graph 622a to yield graph 622b; and in Case 10, graph 622d can comprise a modified and/or updated version of graph 622c, where nodes B and D have been added to graph 622c to yield graph 622d. In this example embodiment, guardrail component 110 can evaluate Case 9 and Case 10 to determine whether either or both such cases satisfy condition 602 defined above with respect to a certain second trace $t_2$ (e.g., trace 628a) of second process $P_2$.

In an example, guardrail component 110 can evaluate graphs 622a and 622b of Case 9 with respect to first trace $t_1$ (e.g., trace 628a) and transformed second trace $t'_2$ (e.g., transformed second trace 630). For instance, guardrail component 110 can evaluate graphs 622a and 622b of Case 9 with respect to trace 628a and transformed second trace 630 to determine whether, based on a calculated value of distance $dist(t_2, t'_2)$, a corresponding value of g( ) is below, at, or above a value of 9 as determined using plot 604. In this example, as illustrated in FIG. 6, based on such evaluation, guardrail component 110 can determine that, in Case 9, although trace 628a of second process $P_2$ does not conform to first process $P_1$ due to the absence of node B in graph 622a, a calculated value of distance $dist(t_2, t'_2)$ is small enough that a corresponding value of function g( ) is above threshold $\theta$ as determined using plot 604. In this example, therefore, there is relatively moderate risk (denoted as safe in FIG. 6) in using model $M_1$ to make prediction 310 on trace 628a of second process $P_2$. In this example, as described above, such relatively moderate risk can be indicative of a relatively moderate level of accuracy corresponding to prediction 310 when model $M_1$ is used to make prediction 310 on trace 628a in Case 9.

In another example, guardrail component 110 can evaluate graphs 622c and 622d of Case 10 with respect to first trace $t_1$ (e.g., trace 628b) and transformed second trace $t'_2$ (e.g., transformed second trace 630). For instance, guardrail component 110 can evaluate graphs 622c and 622d of Case 10 with respect to trace 628b and transformed second trace 630 to determine whether, based on a calculated value of distance dist($t_2$, $t'_2$), a corresponding value of g( ) is below, at, or above a value of θ as determined using plot 604. In this example, as illustrated in FIG. 6, based on such evaluation, guardrail component 110 can determine that, in Case 10, trace 628b of second process $P_2$ does not conform to first process $P_1$ due to the absence of nodes B and D in graph 622c. In this example, as illustrated in FIG. 6, guardrail component 110 can further determine that a calculated value of distance dist($t_2$, $t'_2$) is large enough that a corresponding value of function g( ) is below threshold 9 as determined using plot 604. In this example, therefore, there is relatively high risk (denoted as unsafe in FIG. 6) in using model $M_1$ to make prediction 310 on trace 628b of second process $P_2$. In this example, as described above, such relatively high risk can be indicative of a relatively low level of accuracy corresponding to prediction 310 when model $M_1$ is used to make prediction 310 on trace 628b in Case 10.

In the example embodiments described above with reference to FIGS. 1-6, condition definition component 108 can define condition 302, 502, and/or 602 to facilitate: improved application of model $M_1$; improved performance of model $M_1$; improved accuracy of model $M_1$ in predicting an outcome (e.g., prediction 310) in second process $P_2$; increased reusability of model $M_1$; and/or reduced computational costs of a processor (e.g., processor 106) that can be employed to implement model $M_1$ to predict the outcome (e.g., prediction 310) in second process $P_2$.

In the example embodiments described above with reference to FIGS. 1-6, guardrail component 110 can further determine, based on one or more conditions 302, 502, and/or 602, a number (e.g., a percentage (%), a fraction, etc.) of future process traces 640 of second process $P_2$ that model $M_1$ has an ability to service (e.g., can service). In these example embodiments, it should be appreciated that guardrail component 110 can estimate the impact of a process change on an entity's ability (e.g., an entity as defined above that implements model transfer learning system 102) to continue using a previously trained machine learning model to make a prediction on one or more future process traces of a modified and/or updated process. For instance, as described below, based on a proposed change (e.g., a hypothetical change) in first process $P_1$, which yields a proposed second process $P_2$ (e.g., a hypothetical second process $P_2$), guardrail component 110 can estimate the affect that such a proposed change in first process $P_1$ can have on an entity's ability to continue using model $M_1$ to make prediction 310 on one or more proposed second traces $t_2$ (e.g., one or more hypothetical second traces $t_2$) of such a proposed second process $P_2$.

In various embodiments, future process traces 640 can comprise one or more proposed second traces $t_2$ (e.g., hypothetical second traces $t_2$) of the proposed second process $P_2$ described above that can result from a proposed (e.g., hypothetical) change in first process $P_1$. In these embodiments, to facilitate such determination, based on condition 302, 502, and/or 602, of a number (e.g., a percentage (%), a fraction, etc.) of the proposed second traces $t_2$ (e.g., future process traces 640) described above that model $M_1$ has an ability to service (e.g., can service), guardrail component 110 can analyze each of the proposed second traces $t_2$ based on condition 302, 502, and/or 602 as described above with reference to FIGS. 1-6 to determine which, if any, can be used by model $M_1$ to make prediction 310.

In an example embodiment, an entity (e.g., a business) can have a process (e.g., first process $P_1$ comprising a business process) with a trained model (e.g., model M1). In this example embodiment, the entity can also have a representative set of traces from the process (e.g., first traces $t_1$ from first process $P_1$ comprising the test set of traces from the trained model $M_1$). In this example embodiment, the entity can contemplate a proposed change to the underlying process (e.g., first process $P_1$ comprising a business process). In this example embodiment, to assess the impact of the change on the entity's ability to continue using the trained machine learning model (e.g., model $M_1$) to make a prediction (e.g., prediction 310) on traces (e.g., proposed second traces $t_2$) of the modified and/or updated process resulting from the proposed change, the entity can implement model transfer learning system 102 as follows:
1) create a temporary copy of the process (e.g., first process $P_1$) and implement the process change in that copy (e.g., where the copy comprises second process $P_2$);
2) obtain or generate a set of transformed traces for the temporarily changed process (e.g., where the transformed traces comprise second traces $t_2$ that can be proposed by the entity and/or obtained from running (e.g., via processor 106) second process $P_2$);
3) add the guardrail conditions (e.g., condition 302, 502, and/or 602) described above as a wrapper around the machine learning model (e.g., model $M_1$);
4) run (e.g., via processor 106) the set of transformed traces (proposed second traces $t_2$) through the wrapped model and measure the number (e.g., percentage (%), fraction, etc.) of traces that pass through the guardrails (e.g., analyze the proposed second traces $t_2$ based on condition 302, 502, and/or 602 in accordance with one or more embodiments of the subject disclosure described herein to determine if one or more of such proposed second traces $t_2$ satisfy one or more of such conditions); and/or
5) record (e.g., in memory 104) the number (e.g., percentage (%), fraction, etc.) as the estimate of future traffic (e.g., the estimate of proposed second traces $t_2$ comprising future process traces 640) for which the model can still safely be leveraged (e.g., for which model $M_1$ can be used with relatively low or moderate risk to make prediction 310 on the proposed second traces $t_2$ with relatively high or moderate accuracy, respectively, as described above with reference to FIGS. 1-6).

Model transfer learning system 102 can be associated with various technologies. For example, model transfer learning system 102 can be associated with machine learning technologies, artificial intelligence technologies, cloud computing technologies, directed graph analysis technologies, and/or other technologies.

Model transfer learning system 102 can provide technical improvements to systems, devices, components, operational steps, and/or processing steps associated with the various technologies identified above. For example, model transfer learning system 102 can: define one or more conditions associated with use of a model trained on first traces of a first process to make a prediction on one or more second traces of a second process; and/or determine whether to use the model to make the prediction. In this example, by defining such one or more conditions (e.g., condition 302, 502, and/or 602) and/or determining whether to use the model (e.g., model $M_1$) to make the prediction (e.g., prediction 310) on the one or more second traces (e.g., second traces $t_2$) of the second process (e.g., second process $P_2$), model transfer learning system 102 can thereby facilitate continued use of the model with a relatively low or moderate risk to make the prediction with relatively high or moderate accuracy, respectively, without retraining the model using the second traces as training data. In another example, by defining such one or more conditions (e.g., condition 302, 502, and/or 602) and/or determining whether to use the model (e.g., model $M_1$) to make the prediction (e.g., prediction 310) on the one or more second traces (e.g., second traces $t_2$) of the second process (e.g., second process $P_2$), model transfer learning system 102 can thereby further facilitate at least one of: improved application of the model (e.g., reuse of the model across multiple processes derived from an original process the model is trained on); improved performance of the model (e.g., in generating a prediction on the second trace $t_2$ of the second process $P_2$ with relatively high accuracy); improved accuracy of the model in predicting an outcome (e.g., prediction 310) in the second process; increased reusability of the model; or reduced computational costs of a processor (e.g., processor 106) that can be employed to implement the model to predict the outcome (e.g., prediction 310) in the second process and/or to train the model on the second traces $t_2$.

Model transfer learning system 102 can provide technical improvements to a processing unit (e.g., processor 106, a quantum processor, etc.) associated with model transfer learning system 102. For example, as described above, by defining such one or more conditions (e.g., condition 302, 502, and/or 602) and/or determining whether to use the model (e.g., model $M_1$) to make the prediction (e.g., prediction 310) on the one or more second traces (e.g., second traces $t_2$) of the second process (e.g., second process $P_2$), model transfer learning system 102 can thereby facilitate improved accuracy and thus, performance of the model (e.g., in generating a prediction on the second trace $t_2$ of the second process $P_2$ with relatively high accuracy). In this example, by facilitating such improved accuracy and performance of the model, model transfer learning system 102 can thereby reduce the number of processing execution cycles that must be performed by a processing unit (e.g., processor 106) that can be employed by model transfer learning system 102 to implement the model and generate the outcome (e.g., prediction 310) on the one or more second traces (e.g., second traces $t_2$) of the second process (e.g., second process $P_2$). In this example, by reducing the number of processing execution cycles that must be performed by such a processing unit (e.g., processor 106) in implementing the model to generate the outcome, model transfer learning system 102 can thereby reduce computational costs of such a processing unit (e.g., processor 106).

A practical application of model transfer learning system 102 is that it can be implemented by an entity (e.g., a business) to eliminate the task of, and/or reduce computational costs associated with, retraining a model (e.g., model $M_1$) when an original process on which the model was trained (e.g., a business process) is modified and/or updated. Another practical application of model transfer learning system 102 is that it can be implemented to estimate the extent to which a model trained on first traces of a first process can be used to make a prediction on a proposed process comprising a modified and/or updated version of the first process.

It should be appreciated that model transfer learning system 102 provides a new approach driven by relatively new machine learning (ML) model technologies and/or artificial intelligence (AI) model technologies that currently involve retraining a model after a first process upon which the model has been trained is modified and/or updated. For example, model transfer learning system 102 provides a new automated approach to determining whether and/or to what extent a model can be reused to make a prediction in a second process without retraining the model on the second process, which can comprise a modified and/or updated version of the first process.

Model transfer learning system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Model transfer learning system 102 and/or components thereof, can be employed to solve new problems that arise through advancements in technologies mentioned above, employment of quantum computing systems, cloud computing systems, computer architecture, and/or another technology.

It is to be appreciated that model transfer learning system 102 can utilize various combinations of electrical components, mechanical components, and circuitry that cannot be replicated in the mind of a human or performed by a human, as the various operations that can be executed by model transfer learning system 102 and/or components thereof as described herein are operations that are greater than the capability of a human mind. For instance, the amount of data processed, the speed of processing such data, or the types of data processed by model transfer learning system 102 over a certain period of time can be greater, faster, or different than the amount, speed, or data type that can be processed by a human mind over the same period of time.

According to several embodiments, model transfer learning system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that model transfer learning system 102 can include information that is impossible to obtain manually by an entity, such as a human user. For example, the type, amount, and/or variety of information included in model transfer learning system 102, condition definition component 108, and/or guardrail component 110 can be more complex than information obtained manually by a human user.

Figure 7A:
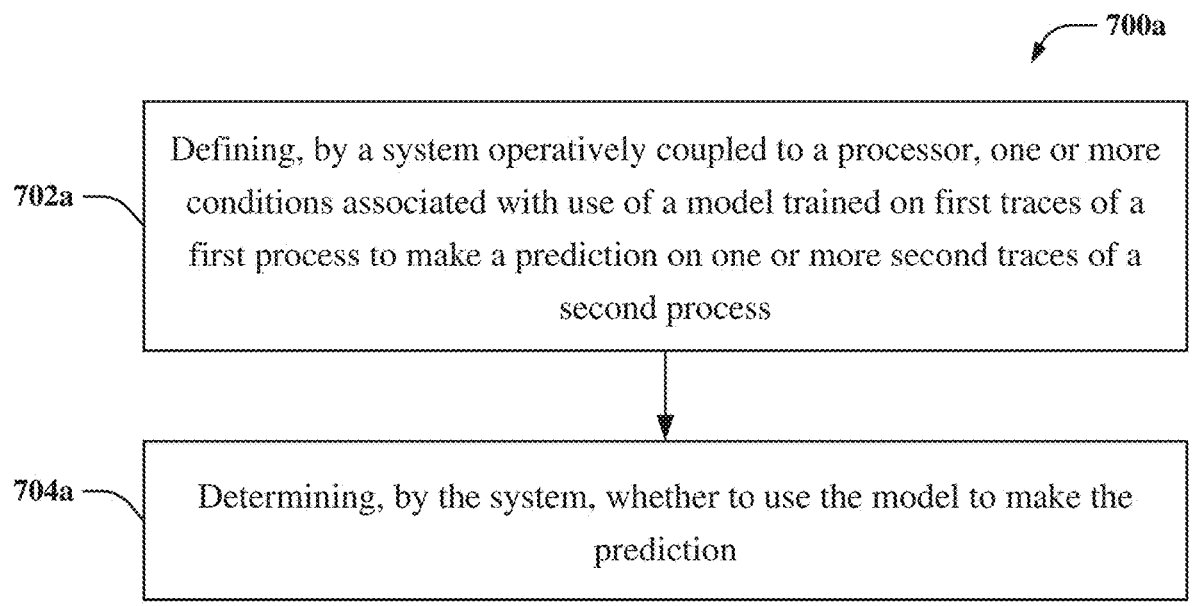
FIGS. 7A and 7B illustrate flow diagrams of example, non-limiting computer-implemented methods that can facilitate model transfer learning across evolving processes in accordance with one or more embodiments described herein.

FIG. 7A illustrates a flow diagram of an example, non-limiting computer-implemented method 700a that can facilitate model transfer learning across evolving processes in accordance with one or more embodiments described herein. Repetitive description of like elements and/or processes employed in respective embodiments is omitted for sake of brevity.

At 702a, computer-implemented method 700a can comprise defining, by a system (e.g., via model transfer learning system 102 and/or condition definition component 108) operatively coupled to a processor (e.g., processor 106, a quantum processor, etc.), one or more conditions (e.g., condition 302, 502, and/or 602 that can be defined by condition definition component 108) associated with use of a model (e.g., model $M_1$) trained on first traces (e.g., first traces $t_1$) of a first process (e.g., first process $P_1$) to make a prediction (e.g., prediction 310) on one or more second traces (e.g., second traces $t_2$) of a second process (e.g., second process $P_2$).

At 704a, computer-implemented method 700a can comprise determining, by the system (e.g., via model transfer learning system 102 and/or guardrail component 110), whether to use the model to make the prediction (e.g., in accordance with one or more of the embodiments described above with reference to FIGS. 1-6).

Figure 7B:
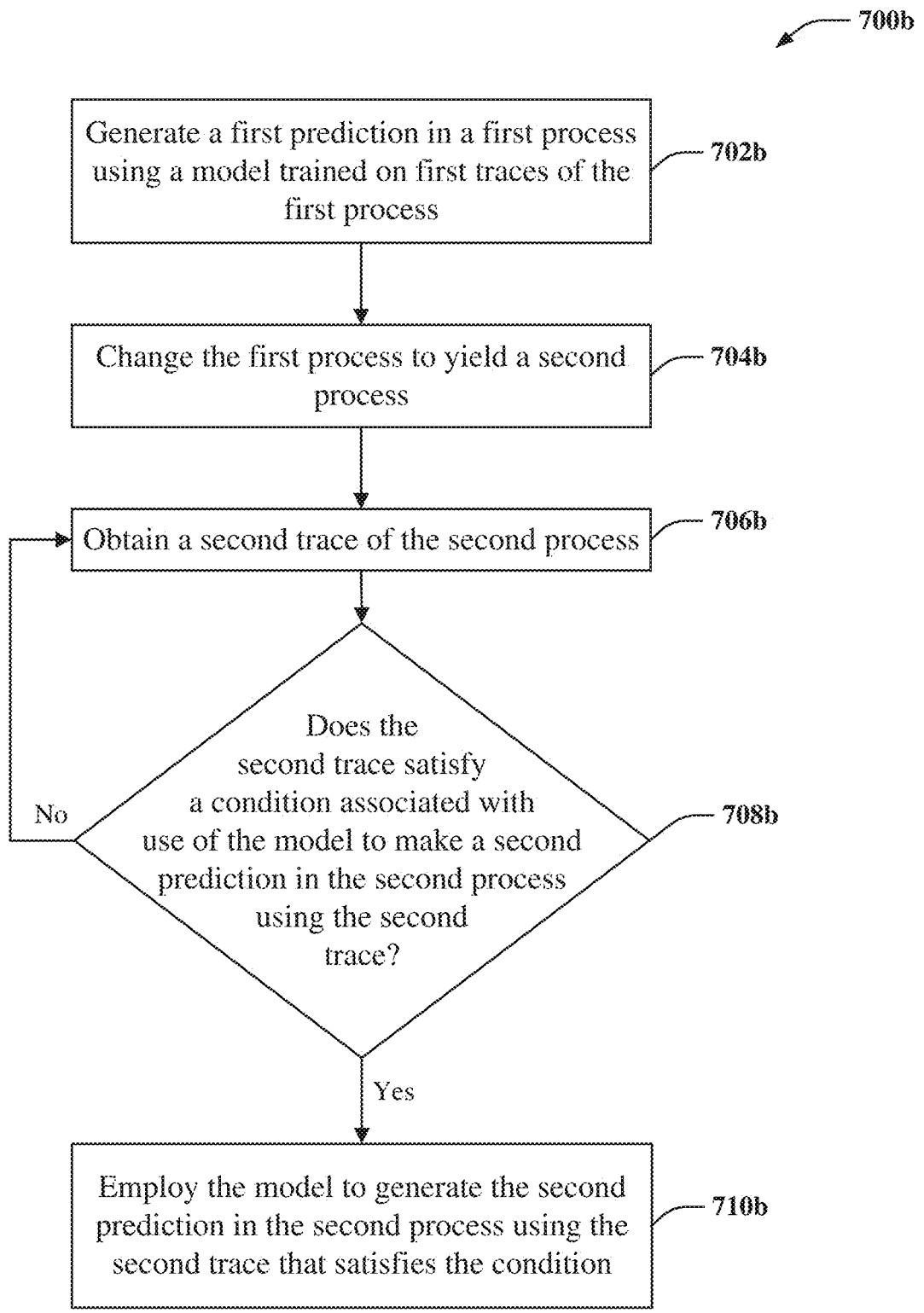

FIG. 7B illustrates a flow diagram of an example, non-limiting computer-implemented method 700b that can facilitate model transfer learning across evolving processes in accordance with one or more embodiments described herein. Repetitive description of like elements and/or processes employed in respective embodiments is omitted for sake of brevity.

At 702b, computer-implemented method 700b can comprise generating (e.g., via a model such as, for instance, model 210 or model $M_1$, that has been trained using any type of machine learning algorithm, etc.) a first prediction (e.g., prediction 214) in a first process (e.g., process 204, first process $P_1$, etc.) using a model (e.g., model 210, model $M_1$, etc.) trained on first traces (e.g., process traces 202, first traces $t_1$, etc.) of the first process.

At 704b, computer-implemented method 700b can comprise changing (e.g., via model transfer learning system 102, processor 106, an entity as defined herein that implements model transfer learning system 102, etc.) the first process to yield a second process (e.g., second process $P_2$).

At 706b, computer-implemented method 700b can comprise obtaining (e.g., via executing second process $P_2$ using processor 106a) a second trace (e.g., second trace $t_2$) of the second process. For example, as described above with reference to FIGS. 1-6, one or more second traces $t_2$ of a second process $P_2$ can be obtained from running (e.g., via processor 106) the second process $P_2$ and/or from an entity (e.g., an entity as defined herein) implementing model transfer learning system 102, where such an entity can propose such one or more second traces $t_2$.

At 708b, computer-implemented method 700b can comprise determining (e.g., via model transfer learning system 102, condition definition component 108, and/or guardrail component 110) whether the second trace satisfies a condition (e.g., condition 302, 502, or 602) associated with use of the model (e.g., by an entity as defined herein that implements model transfer learning system 102) to make a second prediction (e.g., prediction 310) in the second process using the second trace.

If it is determined at 708b that the second trace satisfies the condition (e.g., condition 302, 502, or 602), at 710b, computer-implemented method 700b can comprise employing (e.g., via model transfer learning system 102, processor 106, etc.) the model (e.g., model $M_1$) to generate (e.g., via model $M_1$) the second prediction in the second process using the second trace that satisfies the condition.

If it is determined at 708b that the second trace does not satisfy the condition (e.g., condition 302, 502, and/or 602), computer-implemented method 700b can comprise returning to operation 706b to obtain another second trace of the second process. In an embodiment, computer-implemented method 700b can comprise repeating operations 706b and 708b until all available second traces $t_2$ have been analyzed and determined (e.g., via guardrail component 110) to not satisfy the condition, at which point, computer-implemented method 700b can comprise ending.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
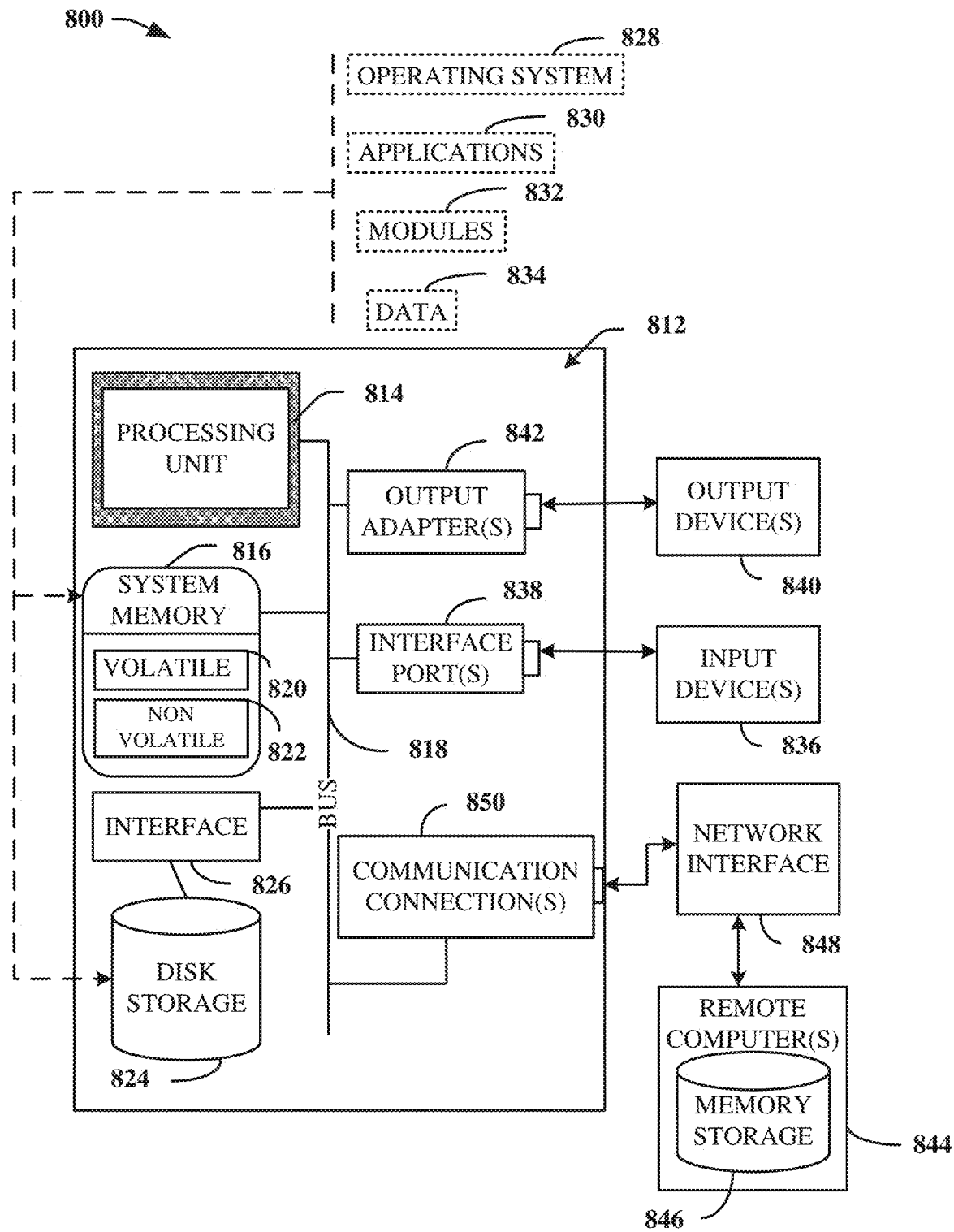
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
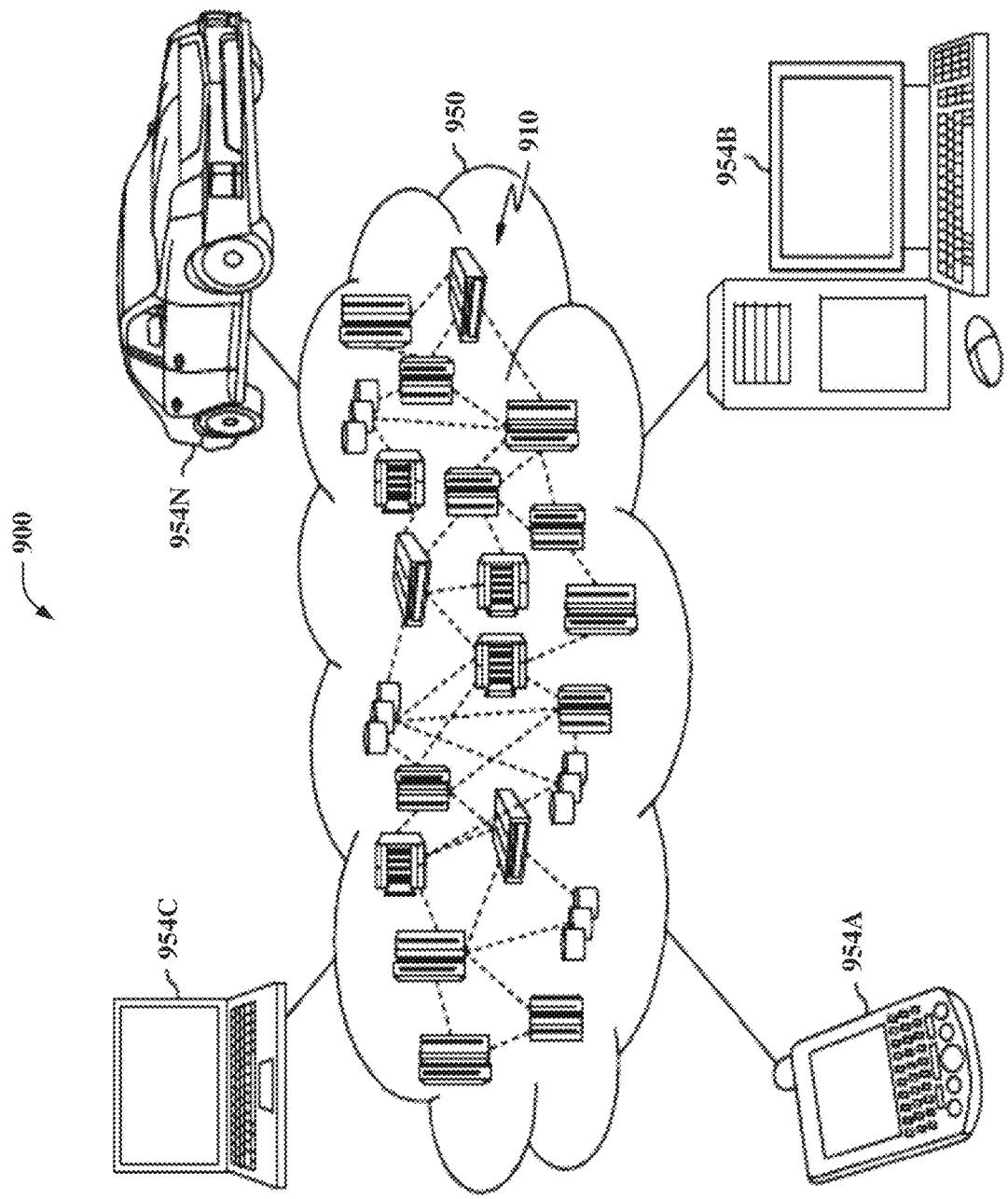
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
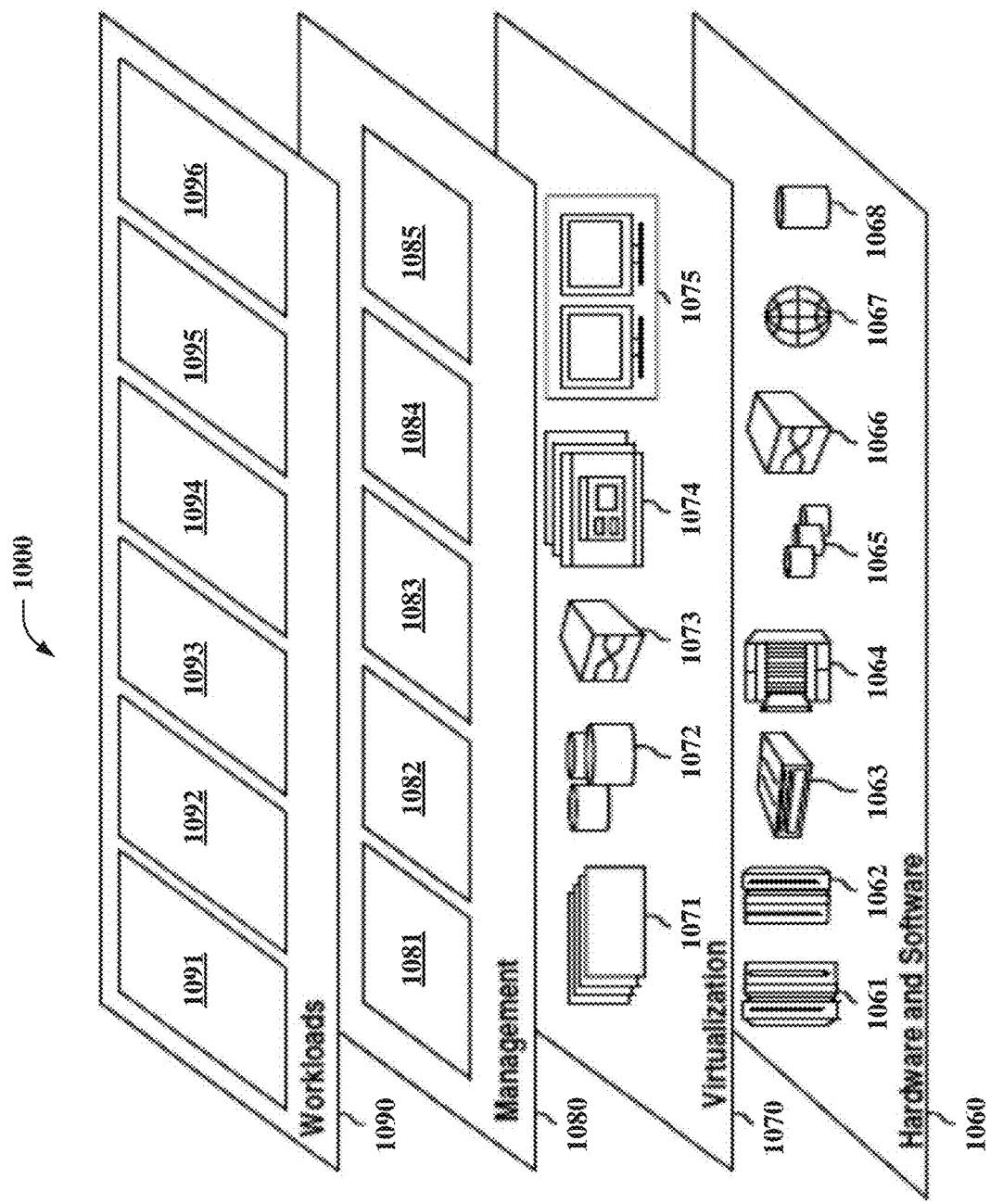
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and model transfer learning software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      a condition definition component that defines one or more conditions associated with use of a model trained on first traces of a first process to make a prediction on one or more second traces of a second process; and
      a guardrail component that determines whether to use the model to make the prediction on the one or more second traces of the second process, wherein the second process is a modified version of the first process, wherein the determination is based on the fraction of the second traces of the second process that the model has the ability to service and comparison of the fraction to a defined threshold.

2. The system of claim 1, wherein the guardrail component analyzes one or more of the first traces, the one or more second traces, a process definition of the first process, and a process definition of the second process to determine whether to use the model to make the prediction.

3. The system of claim 1, wherein the one or more conditions correspond to one or more risks associated with using the model to make the prediction.

4. The system of claim 3, wherein the guardrail component determines whether to use the model to make the prediction based on the one or more risks.

5. The system of claim 1, wherein the guardrail component further determines, based on the one or more conditions, a number of future process traces of the second process the model has an ability to service.

6. The system of claim 1, wherein the condition definition component defines the one or more conditions to facilitate at least one of improved application of the model, improved performance of the model, improved accuracy of the model in predicting an outcome in the second process, increased reusability of the model, or reduced computational costs of the processor.

7. A computer-implemented method, comprising:
   defining, by a system operatively coupled to a processor, one or more conditions associated with use of a model trained on first traces of a first process to make a prediction on one or more second traces of a second process; and
   determining, by the system, whether to use the model to make the prediction, wherein the determining is based on:
      identifying the fraction of the second traces of the second process that pass through the model and adhere to the one or more conditions;
      comparing the fraction to a defined threshold; and
      deciding that the model is able to be used to make the prediction for the second process if the fraction is greater than the defined threshold.

8. The computer-implemented method of claim 7, further comprising:
   analyzing, by the system, one or more of the first traces, the one or more second traces, a process definition of the first process, and a process definition of the second process to determine whether to use the model to make the prediction.

9. The computer-implemented method of claim 7, wherein the second process comprises at least one of a modified version of the first process or a version of the first process developed after development of the first process.

10. The computer-implemented method of claim 7, wherein the one or more conditions correspond to one or more risks associated with using the model to make the prediction.

11. The computer-implemented method of claim 10, further comprising:
   determining, by the system, whether to use the model to make the prediction based on the one or more risks.

12. The computer-implemented method of claim 7, further comprising:
   determining, by the system, based on the one or more conditions, a number of future process traces of the second process the model has an ability to service.

13. The computer-implemented method of claim 7, further comprising:
   defining, by the system, the one or more conditions to facilitate at least one of improved application of the model, improved performance of the model, improved accuracy of the model in predicting an outcome in the second process, increased reusability of the model, or reduced computational costs of the processor.

14. A computer program product facilitating a model transfer learning process across evolving processes, the computer program product comprising a computer readable storage medium having program instructions embodied therewith, the program instructions executable by a processor to cause the processor to:
   define, by the processor, one or more conditions associated with use of a model trained on first traces of a first process to make a prediction on one or more second traces of a second process; and determine, by the processor, whether to use the model to make the prediction determining, by the system, whether to use the model to make the prediction, wherein the determining is based on:
- identifying the number of the second traces of the second process that pass through the model and adhere to the one or more conditions;
- comparing the number to a defined threshold; and
- deciding that the model is able to be used to make the prediction for the second process if the number is greater than the defined threshold.

15. The computer program product of claim 14, wherein the program instructions are further executable by the processor to cause the processor to:

analyze, by the processor, one or more of the first traces, the one or more second traces, a process definition of the first process, and a process definition of the second process to determine whether to use the model to make the prediction.

16. The computer program product of claim 14, wherein the second process comprises at least one of a modified version of the first process or a version of the first process developed after development of the first process.

17. The computer program product of claim 14, wherein the one or more conditions correspond to one or more risks associated with using the model to make the prediction, and wherein the program instructions are further executable by the processor to cause the processor to:

determine, by the processor, whether to use the model to make the prediction based on the one or more risks.

18. The computer program product of claim 14, wherein the program instructions are further executable by the processor to cause the processor to:

determine, by the processor, based on the one or more conditions, a number of future process traces of the second process the model has an ability to service.

19. The computer program product of claim 14, wherein the program instructions are further executable by the processor to cause the processor to:

define, by the processor, the one or more conditions to facilitate at least one of improved application of the model, improved performance of the model, improved accuracy of the model in predicting an outcome in the second process, increased reusability of the model, or reduced computational costs of the processor.

* * * * *